United States Patent [19]

Lindop

[11] 4,240,398
[45] Dec. 23, 1980

[54] CLEANING DEVICE FOR COOKER GRILLS

[76] Inventor: Arthur H. Lindop, Kilbride Post Office, Kilbride, Ontario, Canada

[21] Appl. No.: 948,868

[22] Filed: Oct. 5, 1978

[51] Int. Cl.$^3$ ............................................. A47J 37/00
[52] U.S. Cl. ................................. 126/25 R; 126/41 R
[58] Field of Search .................. 126/25 R, 211, 41 R; 134/19, 20

[56] References Cited

U.S. PATENT DOCUMENTS

| | | | |
|---|---|---|---|
| 2,216,457 | 10/1940 | Salisbury | 126/211 |
| 3,423,568 | 1/1969 | Meckley et al. | 134/20 |
| 3,454,426 | 7/1969 | Taylor | 134/20 |
| 3,490,123 | 1/1970 | Clark | 126/211 |

*Primary Examiner*—Samuel Scott
*Assistant Examiner*—Wesley S. Smith, Jr.

*Attorney, Agent, or Firm*—Hirons, Rogers & Scott

[57] ABSTRACT

A cleaning device for cooking grills, especially barbecue grills, consists of a rectangular frame providing an open grid over which is stretched and supported a thin flexible metal sheet, specifically a sheet of aluminum foil. The device is placed over the grill, causing heat capture and consequent combustion of the residues thereon to a readily removable ash. The spaces in the grid are desirably of a specific size range and the metal sheet is sufficiently flexible for the portions bridging the grid spaces to "balloon" upward into the grid spaces under the action of the combusted gases. The simplest embodiment is of fixed size; an adjustable size embodiment is also provided and a further embodiment includes a storage spool for holding a roll of the flexible metal sheet.

8 Claims, 3 Drawing Figures

CLEANING DEVICE FOR COOKER GRILLS

FIELD OF THE INVENTION

The present invention is concerned with a cleaning device for cooker grills, particularly for the cooker grills of barbecue cookers.

REVIEW OF THE PRIOR ART

The procedure of cooking by grilling on an open metal grill over a fire has now achieved the status of a North American institution. Whatever the nature of the food involved some residue is always left on the grill, and the quantity is always greater and more adherent in the case of the most popular fatty red meats, such as steak and hamburger. The residues are quite difficult to remove mechanically, especially after they have cooled and/or have become baked on by subsequent cooking operations, and there is often a tendency to leave them until they have built up to a considerable level.

DEFINITION OF THE INVENTION

It is therefore an object of the invention to provide a new cleaning device for cooker grills.

It is a more specific object to provide a new cleaning device for cooker grills of completely mechanical nature, and which can be operative during the normal "warm-up" period required to prepare for grilling cooking.

In accordance with the present invention there is provided a cleaning device for cooker grills comprising:

a frame member of a heat-resistant material of a size to cover the part of the grill to be cleaned by a cleaning operation, the frame member providing a supporting grid formed of intersecting grid members, the grid having a plurality of grid openings therethrough which constitute a substantially greater area of the grid than the grid members, and a thin flexible metal sheet mounted by the frame member to be interposed between the supporting grid and a grill to be cleaned on which the device is mounted, the sizes of the said grid openings and the thickness of the said thin metal sheet being such that there is upward movement of the portions of the metal sheet bridging their respective openings into the openings during the cleaning operation.

DESCRIPTION OF THE DRAWINGS

Cleaning devices for cooker grills that are particular preferred embodiments of the invention will now be described, by way of example, with reference to the accompanying diagrammatic drawings, wherein.

Similar parts are given the same reference in all the figures of the drawing.

Description of the Preferred Embodiments

Figure 1:
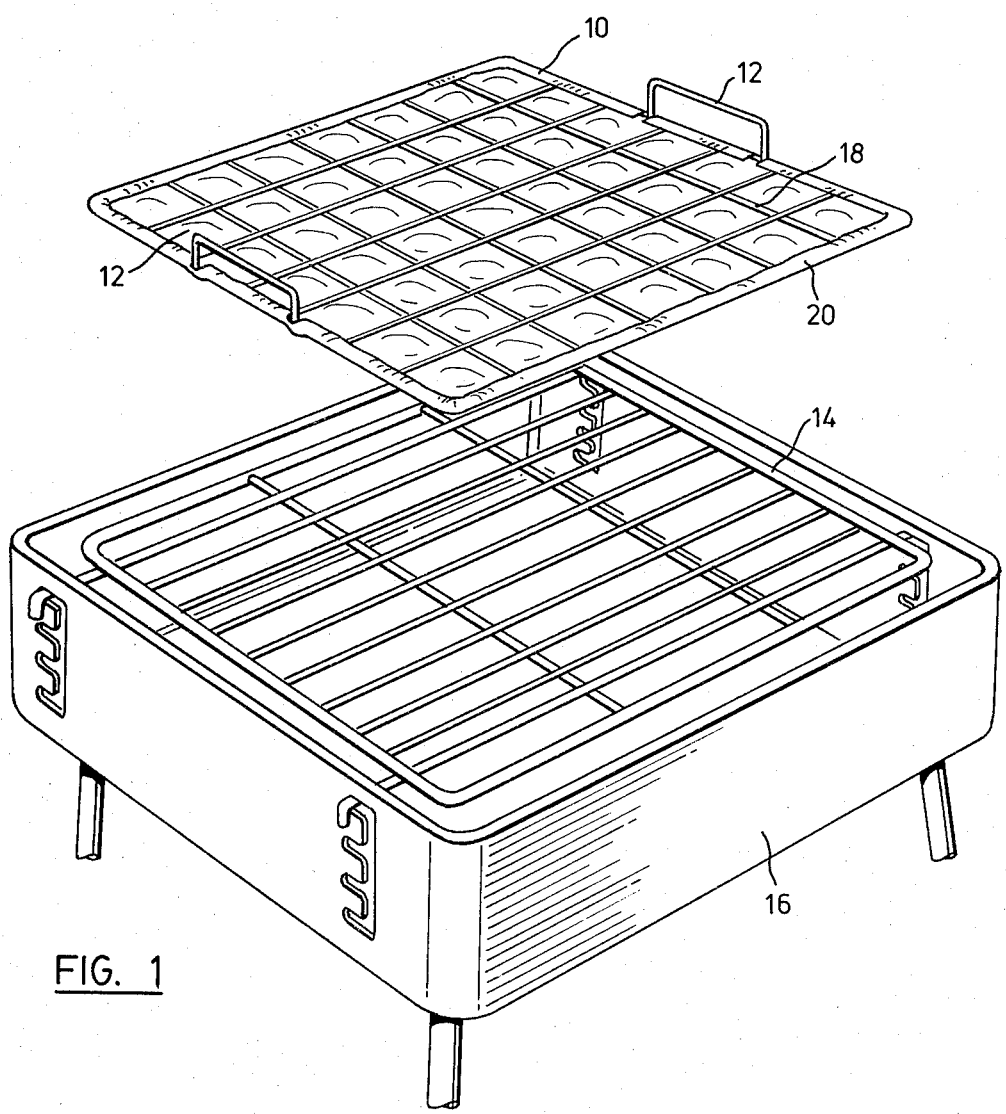
FIG. 1 is a perspective view of a first embodiment comprising a device of fixed size for use with a corresponding size of grill, the device being shown spaced above a grill which it is to be clean.

The embodiment shown in FIG. 1 consists of a rectangular peripheral frame 10 formed from a heavier gauge wire and provided at its shorter sides with upstanding frame handles 12 for ease of handling, the device being illustrated as spaced above the grill 14 of a barbecue 16. The frame member provides a large-mesh supporting grid formed of somewhat thinner wire members 18 than are used for the peripheral frame 10. The wires 18 intersect at right angles to form a plurality of square openings through the device, and it will be seen that the grid is relatively very open construction, the openings thus constituting a substantially greater area of the grid than the supporting wires.

The device is completed by a thin flexible metal sheet 20, specifically a sheet of aluminum foil, preferably of thickness between about 0.0012 and 0.0050 cm, mounted on the underside of the supporting grid so as to be interposed between the supporting grid and the grill 14 to be cleaned. This sheet can be fastened to the frame by folding its edges around the peripheral frame, and aluminum foil is sufficiently malleable to remain in position during normal handling. Aluminum foil usually is produced with one side shiny and one side matte, and preferably the sheet is mounted with the shiny side toward the grill.

In operation the device is placed on the grill at least during the warm-up period that is always required before grilling cooking can begin. The device captures heat generated during this period and applies it to the grill to raise its temperature to a value at which the residues on the grill will be combusted and burn to leave a fine ash that can readily be dusted from the grill with a wire brush. In some instances the warm-up period may not be of sufficient length, but the progress of the cleaning process is easily monitored, since a substantial amount of smoke is given off during the combustion of the residues, and the end process is indicated by the cessation of the emission of such smoke; usually one will wait one or two minutes more to ensure that cleaning is completed. It is found that with barbecues employing heated rocks, such as gas barbecues, that the cleaning process also removes undesirable residues from the rocks.

It is found unexpectedly that there is a specific preferred range of dimensions for the size of the openings formed by the grid wires 18, a specific preferred range of the thickness of the foil, and a corresponding correlation between the opening size and the sheet thickness. Preferably the openings are of side length between about 3.5 and 7 cm and, with a foil of the preferred thickness, the portions of the foil bridging the grid opening are found to "balloon" upwards between the wire members 18 into the grid openings under the upward thrust of the combusted gases, and this ballooning appears to be important in obtaining a complete heat capture cleaning. For aluminum foil the preferred range of thickness is about 0.0012 to 0.0050 cm., a thinner material being too thin for useful handling, while the thicker materials are found not to be efficient. A more preferred range is from about 0.0018 to 0.0030 cm., with the material of lower thickness in this range particularly preferred. The employment of a relatively rigid metal sheet i.e. of thickness much more than the preferred upper value, is found to be relatively ineffective, in that the residues simply transfer to the rigid sheet and then back to the grill, and even become simply more hard baked on to the grill than before without apparently reaching a suitable combustion temperature. At this time I have no explanation for this beneficial effect.

Figure 2:
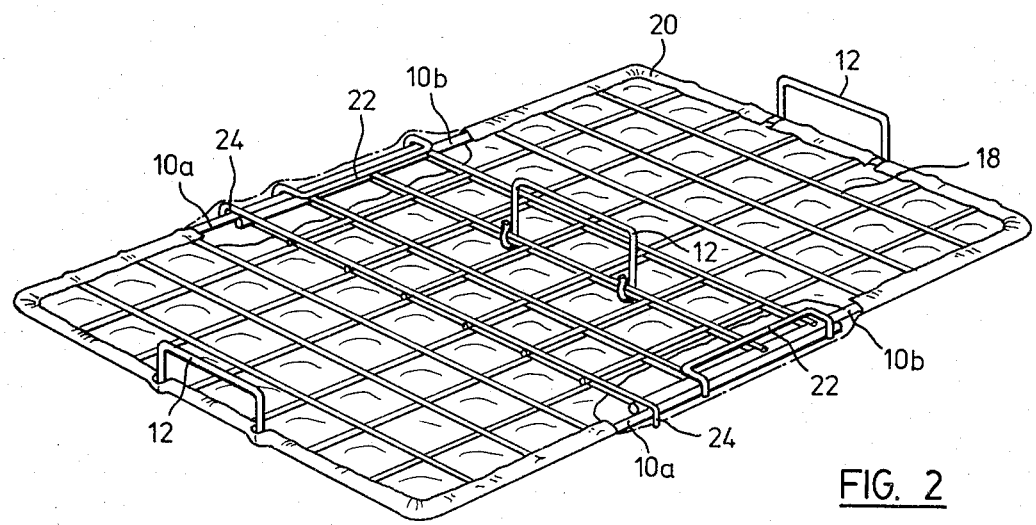
FIG. 2 is a similar view of a second embodiment comprising a device of variable size, and consequently adaptable for use with grills of different sizes.

The embodiment of FIG. 2 is functionally the equivalent of that of FIG. 1, but the frame is made in two separate parts which are movable lengthwise relative to one another to permit adjustment of the length of the frame to suite the length of the grill on which it is to be placed. In this embodiment the frame part 10a has two opposed longitudinal loop portions 22 which embrace the frame part 10b and retain it while guiding it for the necessary movement. The frame part 10b carries two stop members 24 which prevent the frame parts from separating at the maximum size position. Each of the separate frame parts may be provided with a handle at its respective free end. Alternatively, or in addition, a single central handle 12 can be employed having looped ends that snap over two vertically registering wires on the two frame parts so as to hold them together and thereby hold the frame at the required size.

Figure 3:
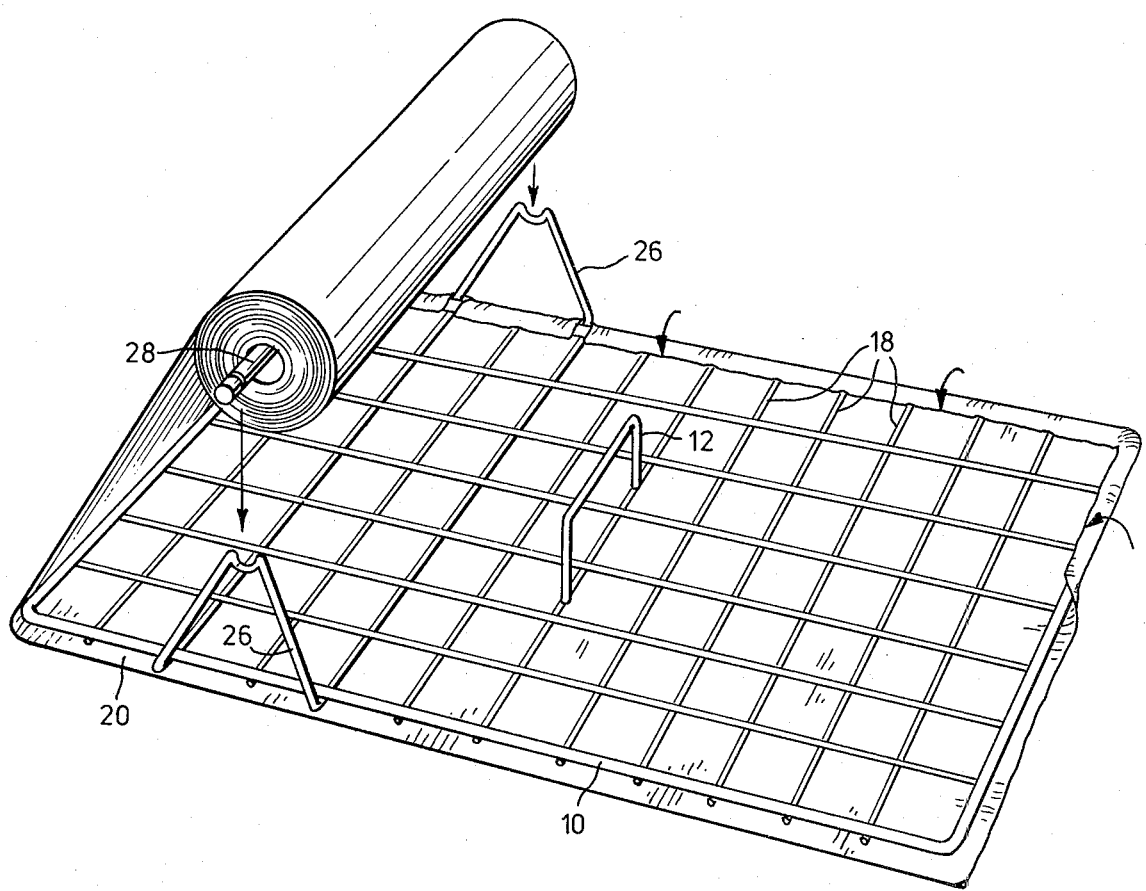
FIG. 3 is a similar view of a third embodiment, comprising a device including a storage roll of the thin metal sheet employed therewith.

The embodiment of FIG. 3 includes two spaced wire spool support members 26 mounted on the frame part 10, the members 26 supporting thereon for rotation a spool 28 on which can be mounted a roll of the preferred aluminum foil. As each sheet of foil becomes torn or excessively dirty and is discarded a new piece can be withdrawn from the roll and mounted on the frame.

Although a metal wire frame and grid have been described it will be apparent to those skilled in the art that a frame and grid of other materials, e.g. ceramics, could be employed, but are unlikely to be as economical in manufacture as metal wire. In the case of gas barbecue cookers it is found that the frame and grid can be of about the same size as the grill to be cleaned, since they are provided with vent holes for combustion air and there are usually sufficient apertures for the combusted gases to escape readily. In the case of a charcoal cooker the frame may need to be somewhat smaller than the grill, so as to provide for adequate flow of air over the charcoal for the proper combustion thereof. A square or rectangular device may be used on a circular grill and will clean the part of the grill immediately beneath it and for a distance of a few centimeters from its edges. It is found that the use of the device increases the temperature of the grill, with the result that it is in an especially satisfactory state for barbecuing immediately after such use, producing immediate searing of the meat placed thereon.

I claim:

1. A cleaning device for a cooker grill comprising:
   a frame member of a heat-resistant material of a size to cover the part of the grill to be cleaned by a cleaning operation;
   the frame member providing a supporting grid formed of intersecting grid members, the grid having a plurality of grid openings therethrough which constitute a substantially greater area of the grid than the grid members; and
   a thin flexible metal sheet mounted by the frame member to be interposed between the supporting grid and a grill to be cleaned on which the device is mounted, wherein the said supporting grid has a plurality of rectangular openings of side length between 3.5 and 7 cm. the sizes of the said grid openings and the thickness of the said thin metal sheet being such that there is upward movement of the potions of the metal sheet bridging their respective openings into the openings during the cleaning operation.

2. A device as claimed in claim 1, wherein the said frame member and the supporting grid are both formed of wire.

3. A device as claimed in claim 1, wherein the said flexible metal sheet is a sheet of aluminum foil.

4. A device as claimed in claim 3, wherein said aluminum foil is of thickness from about 0.0012 to 0.0050 cm.

5. A device as claimed in claim 4, wherein said aluminum foil is of thickness from about 0.0018 to 0.0030 cm.

6. A device as claimed in claim 1, wherein the said frame member is formed as two parts connected together for movement relative to one another for adjustment of the size of the device.

7. A device as claimed in claim 6, including a handle engagable with vertically registering grid members to hold them together and thereby hold the frame member at a predetermined size.

8. A device as claimed in claim 1, and including a storage device mounted to one edge of the device for storage thereon of a strip of the said flexible metal sheet, the device permitting withdrawal of the sheet for mounting on the frame member.

* * * * *